United States Patent
Kakeno (10) Patent No.: US 6,705,970 B2
(45) Date of Patent: Mar. 16, 2004

(54) PLANETARY DIFFERENTIAL GEAR TYPE REDUCTION DEVICE, DRIVING DEVICE WITH A REDUCTION MECHANISM AND IMAGE FORMING APPARATUS

(75) Inventor: Sadao Kakeno, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/207,160

(22) Filed: Jul. 30, 2002

(65) Prior Publication Data

US 2003/0027681 A1 Feb. 6, 2003

(30) Foreign Application Priority Data

Jul. 31, 2001 (JP) .......................................... 2001-231407

(51) Int. Cl.$^7$ ............................................. F16H 57/08
(52) U.S. Cl. ........................................ 475/339; 475/344
(58) Field of Search ................................ 101/248, 216; 475/339, 344

(56) References Cited

U.S. PATENT DOCUMENTS

| | | |
|---|---|---|
| 3,875,376 A | 4/1975 | Kakeno |
| 4,284,993 A | 8/1981 | Kakeno |
| 4,291,316 A | 9/1981 | Kakeno et al. |
| 4,321,608 A | 3/1982 | Kakeno |
| 4,322,732 A | 3/1982 | Furukawa et al. |
| 4,429,317 A | 1/1984 | Umezawa et al. |
| 4,524,365 A | 6/1985 | Kakeno et al. |
| 4,847,631 A | 7/1989 | Naruse et al. |
| 5,459,925 A * | 10/1995 | Akeel et al. ................ 29/893.2 |

FOREIGN PATENT DOCUMENTS

| | | | |
|---|---|---|---|
| JP | 63006248 A * | 1/1988 | .................. 475/339 |
| JP | 5-126212 | 5/1993 | |
| JP | 6-20935 | 6/1994 | |
| JP | 8-334164 | 12/1996 | |
| JP | 2001-173733 | 6/2001 | |

* cited by examiner

Primary Examiner—Dirk Wright
(74) Attorney, Agent, or Firm—Oblon, Spivak, McClelland, Maier & Neustadt, P.C.

(57) ABSTRACT

A planetary differential gear type reduction device of the present invention includes an output gear affixed to an output shaft connected to an object to be driven. A stationary gear has a smaller number of teeth than the output gear and is coaxial with the output shaft, but not rotatable. A planetary gear is rotatably mounted on a planetary gear shaft, which is driven by the torque of a drive source to revolve round the output gear and stationary gear, and revolves round the output gear and stationary gear in mesh therewith. The planetary gear has a first portion and a second portion meshing with the stationary gear and output gear, respectively, and having the same number of teeth as each other. At least one of the output gear, stationary gear and first portion and second portion of the planetary gear is implemented as a profile shifted gear.

61 Claims, 5 Drawing Sheets

PLANETARY DIFFERENTIAL GEAR TYPE REDUCTION DEVICE, DRIVING DEVICE WITH A REDUCTION MECHANISM AND IMAGE FORMING APPARATUS

BACKGROUND OF THE INVENTION

1. Field of the Invention

The present invention relates to a planetary differential gear type reduction device for reducing the rotation speed of a drive source to one necessary for a desired object, a driving device with a reduction mechanism using such a reduction device, and an image forming apparatus using the driving device.

2. Description of the Background Art

It is a common practice with an image forming apparatus to transfer the output torque of a motor or similar drive source to a desired rotary body via speed reducing means. For this purpose, use is generally made of a gear train, a worm gear or a belt reduction mechanism. The rotary body is any one of a photoconductive drum, an image transfer belt, a fixing roller and so forth. While the rotary body rotates at a speed of several ten to several hundred revolutions per minute, the motor or drive source generates rotates at a speed of several thousand revolutions per minute. Therefore, to cause the rotary body to rotate at the above, speed, speed reducing means with a reduction ratio of about 1/10 to 1/30 is necessary. The accuracy of rotation of such a rotary body has critical influence on the quality of images. However, it is difficult with the conventional speed reducing means to accurately transmit a constant-speed torque from the drive source to the rotary body due to limited machining accuracy and limited assembling accuracy.

Some different methods are available for realizing the accurate transmission of a constant-speed torque. For example, a pitch irregularity frequency band in which the variation of speed transmission (variation of rotation speed) is conspicuous may be raised, i.e., a perceivable spatial frequency (cycle/mm) may be raised. With this method, it is possible to reduce the banding, jitter and granularity of an image particular to an image forming apparatus. In this case, the pitch irregularity of an image should preferably lie in a band ranging from the order of several centimeters to several ten micrometers to the order of several micrometers. Another method for the accurate transmission of a constant-speed torque is reducing the number of reduction steps, i.e., the number of locations where the rotation speed varies. Other methods include using a reduction mechanism resistive to load variations to thereby reduce backlash ascribable to the accumulation of the number of reduction steps, guaranteeing a sufficient inertia moment, and preventing gear accuracy from falling due to thermal expansion ascribable to temperature elevation inside the apparatus.

Reducing the number of reduction steps is particularly effective to realize the accurate transmission of a constant-speed torque. Further, a decrease in the number of reduction steps reduces the number of structural parts and therefore cost, obviates the critical fall of transmission efficiency, and reduces noise ascribable to the intermeshing of gears. In addition, such a method implements a small size, compact image forming apparatus.

A large reduction ratio is required in fields other than the field of image forming apparatuses, too. Various methods have been proposed in the past for implementing a large reduction ratio and include one using a planetary gear mechanism, one using an internal gear mechanism with a small difference in the number of teeth, and one using a harmonic drive mechanism. The problem with the planetary gear mechanism is that a reduction ratio is generally limited to about 1/10 for various reasons. A reduction ratio above 1/10, e.g., a reduction ratio of 1/20 is not achievable without resorting to two reduction steps, which complicate the construction and need an extra space. The internal gear mechanism is not practicable without resorting to a balance weight because planetary gears rotate at high speed with eccentricity. Although the harmonic drive mechanism involves no backlash and therefore achieves high positioning accuracy, it constantly needs preload with the result that a heavy load acts even during idling.

When any one of the reduction schemes described above is applied to, e.g., a photoconductive drum, use is generally made of an internal gear. However, when an internal gear and a spur gear (pinion) are intermeshed for speed reduction, a desired reduction ratio cannot be easily selected due to various limitations including involute interference, trochoid interference and trimming.

In light of the above, there should preferably be constructed speed reducing means capable of accurately transmitting a constant-speed rotation and implementing a great reduction ratio without using an internal gear and with a minimum of reduction steps. This kind of speed reducing means may be implemented as a planetary differential gear type reduction device taught in, e.g., "HANDBOOK OF EXAMPLES OF MODERN MACHINE TECHNOLOGIES", GENDAI KOGAKU-SHA, Volume 2, page 679, section 2717. The planetary differential gear type reduction device includes four-joint planetary gears including two external gears. More specifically, two planetary gears whose numbers of teeth are $Z_2$ and $Z_4$, respectively, are coaxially mounted on the ends of an arm affixed to an input shaft. A stationary gear having a number of teeth of $Z_3$ and an output shaft mounted on an output shaft and having a number of teeth of $Z_5$ are held in mesh with the two planetary gears. However, because the two planetary gears are different in the number of teeth, the input shaft and output shaft cannot be made coaxial in a single module unless the numbers of teeth mentioned above satisfy a relation:

$$Z_2 + Z_3 = Z_4 + Z_5 \qquad \text{Eq. (1)}$$

A reduction ratio available with this type of reduction device is expressed as:

$$N_5 = N_1 \times (Z_2 \times Z_5 - Z_3 \times Z_4)/(Z_2 \times Z_5) \qquad \text{Eq. (2)}$$

where $N_1$ denotes the rotation speed of the input shaft, and $N_5$ denotes the rotation speed of the output shaft.

To implement a reduction ratio of about 1/10 with this type of reduction device, $Z_2$ and $Z_5$ must be, e.g., twenty each while $Z_3$ and $Z_4$ must be nineteen each. Further, for a reduction ratio of about 1/20, $Z_2$ and $Z_5$ must be, e.g., forty each while $Z_3$ and $Z_4$ must be thirty-nine each. Moreover, for a reduction ratio of about 1/30, $Z_2$ and $Z_5$ must be, e.g., sixty each while $z_3$ and $Z_4$ must be fifty-nine each. In this manner, the number of teeth required of the individual gear increases with an increase in reduction ratio, resulting in a bulky gear mechanism. This increases the diameter of revolution of the planetary gears mounted on the arm. This type of reduction gear is therefore not feasible for high-speed rotation and makes the apparatus large size.

Technologies relating to the present invention are also disclosed in, e.g., Japanese Utility Model Publication No. 6-20935 and Japanese Patent Laid-Open Publication Nos. 5-126212, 8-334164 and 2001-173733.

SUMMARY OF THE INVENTION

It is an object of the present invention to provide a planetary differential gear type reduction device capable of implementing a great reduction ratio with a small, compact configuration and accurately transferring a constant-speed rotation.

It is another object of the present invention to provide a driving device with a reduction mechanism capable of accurately transferring a constant-speed rotation to a desired object.

It is still another object of the present invention to provide an image forming apparatus capable of forming high-quality images by rotating various rotary bodies thereof with high accuracy.

A planetary differential gear type reduction device of the present invention reduces the rotation speed of a drive source to one necessary for an object to be driven to thereby transfer the output torque of the drive source. The reduction device includes an output gear affixed to an output shaft connected to the object. A stationary gear has a smaller number of teeth than the output gear and is coaxial with the output shaft, but not rotatable. A planetary gear is rotatably mounted on a planetary gear shaft, which is driven by the torque of the drive source to revolve round the output gear and stationary gear, and revolves round the output gear and stationary gear in mesh therewith. The planetary gear has a first portion and a second portion meshing with the stationary gear and output gear, respectively, and having the same number of teeth as each other. At least one of the output gear, stationary gear and first and second portions of the planetary gear is implemented as a profile shifted gear.

A driving device with a reduction mechanism using the above planetary differential gear type reduction device and an image forming apparatus using the driving device are also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
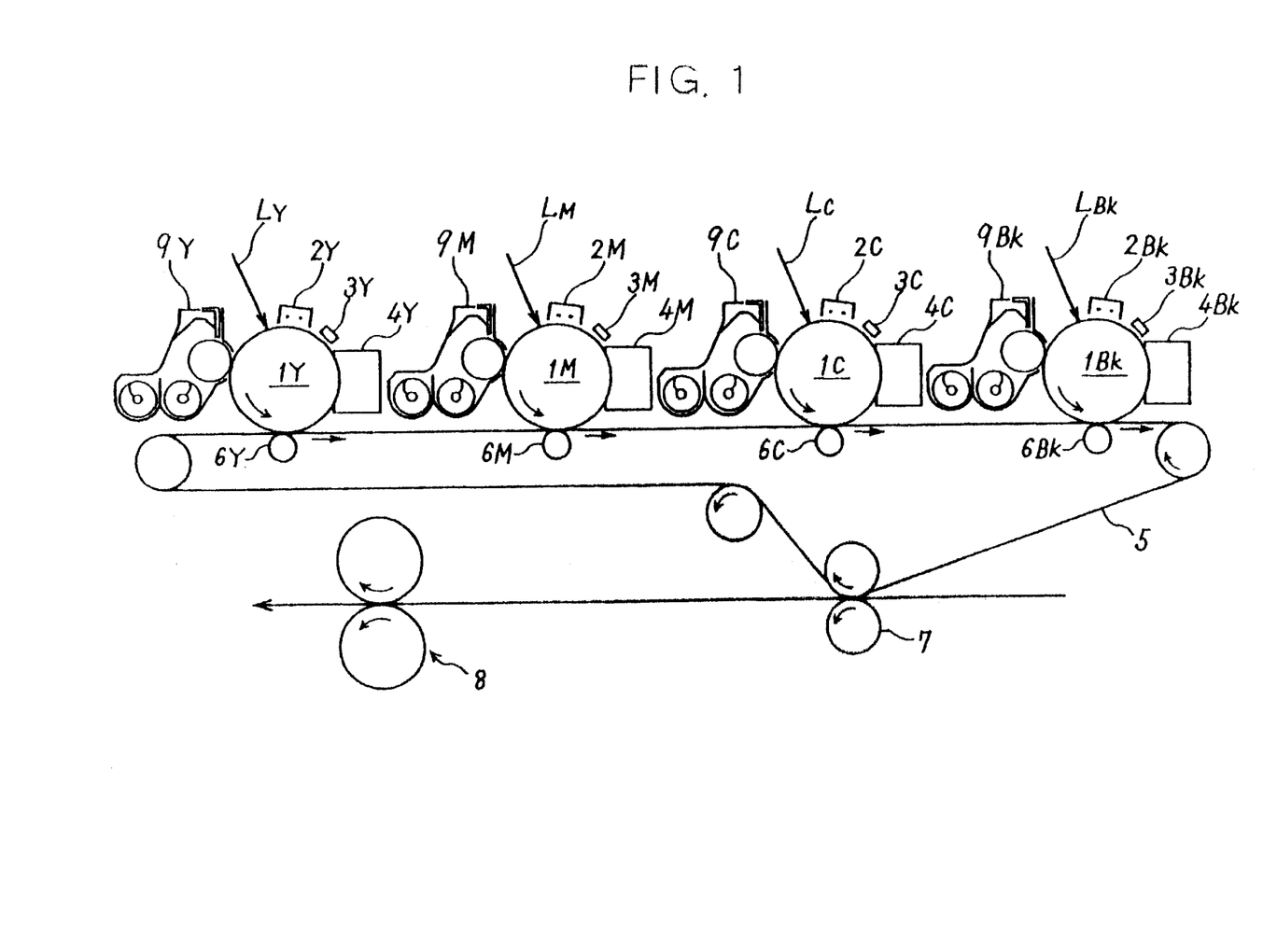
FIG. 1 is a view showing the general construction of an image forming apparatus embodying the present invention.

Referring to FIG. 1 of the drawings, an image forming apparatus embodying the present invention is shown and implemented as an electrophotographic color copier by way of example. The copier to be described has a tandem configuration and uses dry developers of different colors that are toner and carrier mixtures. As shown, the copier includes four photoconductive drums or rotary image carriers 1Y (yellow), 1M (magenta), 1C (cyan) and 1Bk (black) arranged side by side. An endless intermediate image transfer belt (simply belt hereinafter) 5 is passed over a plurality of rollers including a drive roller. The drums 1Y through 1Bk are spaced from each other in the direction of movement of the belt 5 and held in contact with the belt 5.

A charger 2Y, a developing unit 9Y, a cleaning unit 4Y, a quenching lamp 3Y and other process units are sequentially arranged around the drum 1Y in accordance with the sequence of an electrophotographic process. Such process units are also arranged around each of the other drums 1M, 1C and 1Bk in an identical configuration and are distinguished by suffices M, C and Bk attached to the reference numerals.

In a full-color mode, a drum driving device, which will be described later, causes the drum 1Y to rotate in a direction indicated by an arrow in FIG. 1 while the charger 2Y uniformly charges the surface of the drum 1Y. An optical writing unit, not shown, scans the charged surface of the drum 1Y with a light beam LY to thereby form a Y latent image on the drum 1Y. The developing unit 9Y develops the Y latent image with Y toner contained in a developer stored therein. For development, a preselected bias for development is applied between the drum 1Y and a developing roller included in the developing unit 9Y, so that the Y toner is electrostatically transferred from the developing roller to the Y latent image on the drum 1Y. As a result, a Y toner image is formed on the drum 1Y.

The drum 1Y in rotation conveys the Y toner image to a primary image transfer position where the drum 1Y and belt 5 contact each other. At the primary image transfer position, a preselected bias is applied to the inner surface or reverse surface of the belt 5 via a primary image transfer roller 6Y. The resulting electric field causes the Y toner image to be transferred from the drum 1Y to the belt 5 (primary image transfer). An M toner image, a C toner image and a Bk toner image are formed in the same manner as the Y toner image and sequentially transferred to the belt 5 over the Y toner image in register, completing a full-color image.

The belt 5 in rotation conveys the full-color image to a secondary image transfer position where the belt 5 faces a secondary image transfer roller 7. A registration roller pair, not shown, conveys a sheet or recording medium to the secondary image transfer position at a preselected timing. The secondary image transfer roller 7 applies a preselected bias to the reverse surface of the sheet. The resulting electric field and contact pressure acting at the secondary image transfer position cause the full-color image to be transferred from the belt 5 to the sheet. A fixing roller pair 8 fixes the full-color image on the sheet. Finally, the sheet with the fixed image, i.e., a copy is driven out of the copier to a copy tray not shown.

Hereinafter will be described a planetary differential gear type reduction device or reducing means and a drum driving device or drive means using the same, which are the characteristic features of the present invention. Because drum driving devices assigned to the drums 1Y through 1Bk are identical in configuration with each other, let the following description concentrate on one of them assigned to the drum 1Y by way of example.

Figure 2:
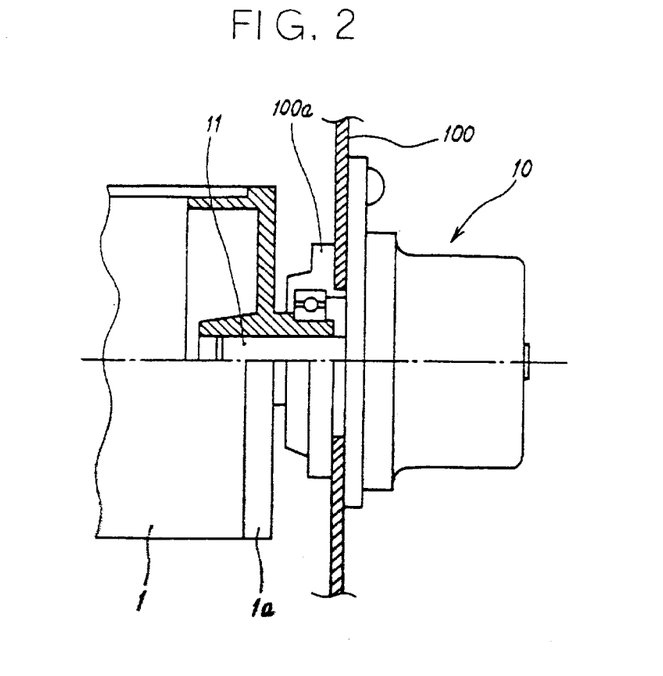
FIG. 2 is a fragmentary section showing a drum driving device adjoining one axial end of a photoconductive drum included in the illustrative embodiment.

FIG. 2 is a fragmentary section showing the drum driving device, generally 10, adjoining one axial end of the drum 1. As shown, a disk-like drum flange 1a is affixed to the end of the drum 1 in such a manner as to cover the end face of the drum 1. The drum driving device 10 includes an output shaft 11 to which the center of the drum flange 1a is affixed, so that the rotation of the output shaft 11 is transferred to the drum flange 1a. A bearing 100a is mounted on a side wall 100 that forms part of the frame of the copier. The bearing 100a supports the output shaft 11 such that the output shaft 11 is smoothly rotatable. The drum driving device 10 faces the drum 1 with the intermediary of the side wall 100 and affixed to the side wall 100.

Figure 3:
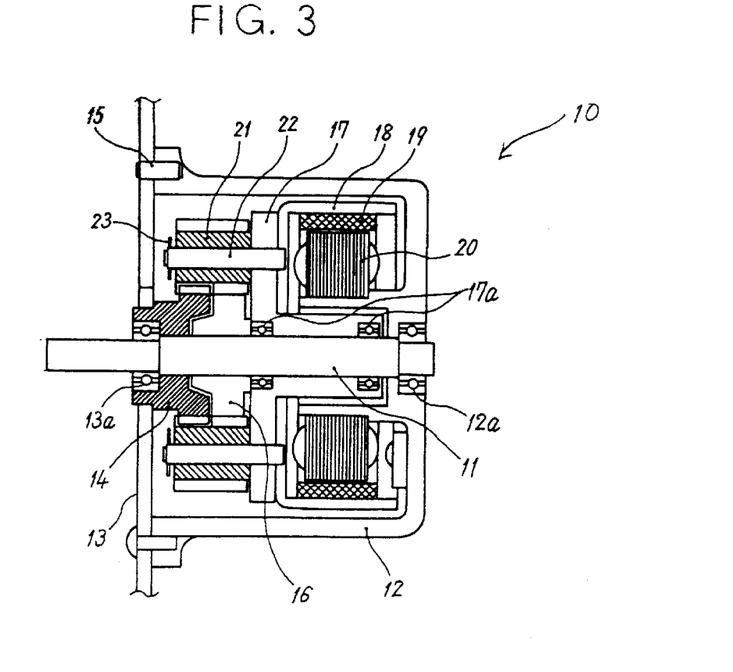
FIG. 3 is a section showing the internal configuration of the drum driving device.

More specifically, as shown in FIG. 3, the drum driving device 10 includes a casing made up of a hollow cylindrical cover 12 and a disk-like lid member 13 closing the open end of the cover 12. The output shaft 11 is passed through the center of the lid member 13 and extends throughout the drum driving device 10. Bearings 12a and 13a are respectively mounted on the cover 12 and lid member 13 and rotatably support the output shaft 11. The bearing 13a mounted on the lid member 13 is affixed to an a stationary gear 14 press-fitted in the lid member 13. To insure the smooth rotation of the output shaft, 11, the bearings 12a and 13a must be precisely coaxial with each other. For this purpose, the bearings 12a and 13a are assembled by use of screws, circumference caulking or similar method.

An output gear 16 is press-fitted or otherwise firmly affixed to the output shaft 11 inside the cover 12. A rotary disk or power inputting member 17 is rotatably mounted on the output shaft 11 via a disk bearing 17a. An outer rotor 18 is caulked, press-fitted, adhered or otherwise firmly affixed to the disk 17 with a center thereof coinciding with the output shaft 11. A magnet or torque transmitting member 19 is affixed to the inner periphery of the outer rotor 18 that is parallel to the output shaft 11. Two stator cores or drive sources 20 are affixed to the cover 12 in a space between the inner periphery of the outer rotor 18 and the output shaft 11. The stator cores 20 are positioned symmetrically to each other with respect to the output shaft 11 in the optimal positional relation to the magnet 19.

Two planetary gears 21 revolve round a sun gear made up of the stationary gear 14 and output gear 16, and each is mounted on a respective planetary gear shaft 22, which is press fitted or otherwise affixed to the disk 17. The planetary gear shafts 22 are parallel to the output shaft 11 and affixed to the disk 17 symmetrically to each other with respect to the output shaft 11. The planetary gear shafts 22 are positioned such that the distance between the axis of each planetary gear 21 and that of the output shaft 11 is optimal for the planetary gear 21 and the stationary gear 14 and output gear 16 to mesh each other. A stop ring 23, for example, retains each planetary gear 21 on the associated planetary gear shaft 22. The stop ring 23 prevents the planetary gear 21 from slipping out of the planetary gear shaft 22 during rotation and maintains the meshing relation between the planetary gear 21 and the stationary gear 14 and output gear 16.

When the outer rotor 18 is rotated, it causes the disk 17 to rotate about the output shaft 11 with the result that the planetary gears 21 revolve round the stationary gear 14 while rotating about their own axes. Because the planetary gears 21 are held in mesh with the output gear 16 also, the output gear 16 rotates by a difference in the number of teeth between itself and the stationary gear 14. At least one of the stationary gear 14 and output gear 16 is implemented as a profile shifted gear, so that the actual intermeshing pitch circles of the gears 14 and 16 are identical when the gears 14 and 16 mesh with the planetary gears 21. This allows each planetary gear 21 to adequately mesh with the gears 14 and 16 each having a particular number of teeth.

Figure 4:
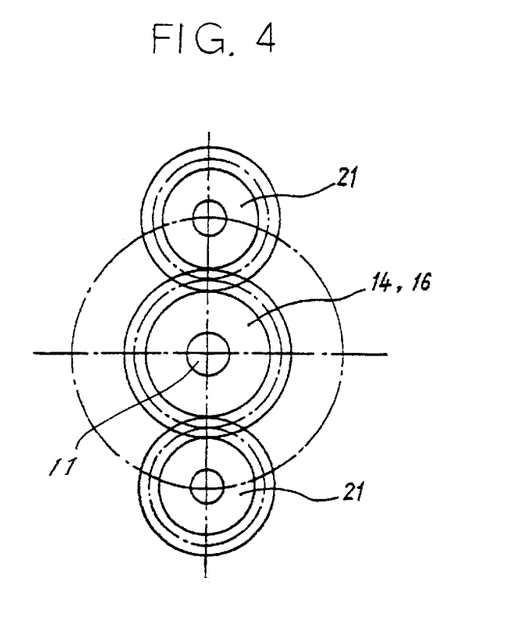
FIG. 4 is an axial front view showing the output shaft of the drum driving device.
Figure 5:
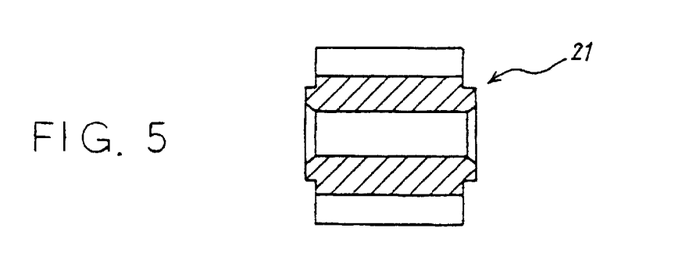
FIG. 5 is an external view showing a specific configuration of a planetary gear to be used when a difference in the number of teeth between a stationary gear and an output gear included in the drum driving device is even.

FIG. 4 shows the drum driving device 10 as seen in the axial direction of the output shaft 11. As shown, the stationary gear 14 and output gear 16 both are positioned coaxially with the output shaft 11. The two planetary gears 21 revolve round the stationary gear 14 while being maintained symmetrical to each other. Assume that a difference in the number of teeth between the stationary gear 14 and the output gear 16 is even. Then, as shown in FIG. 5, part of each planetary gear 21 meshing with the stationary gear 14 and part of the same meshing with the output gear 16 have an identical configuration.

Figure 6:
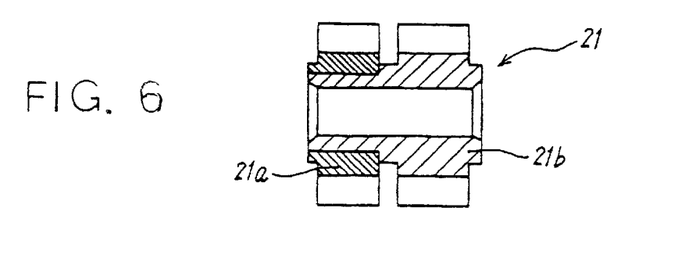
FIG. 6 is a view similar to FIG. 5, showing another specific configuration of the planetary gear to be used when the difference in the number of teeth is odd.

On the other hand, assume that a difference in the number of teeth between the stationary gear 14 and the output gear 16 is odd. Then, as shown in FIG. 6, one of two parts 21a and 21b of each planetary gear 21 meshing with the stationary gear 14 and output gear 16, respectively, is shifted from the other part by half a pitch. To implement such a shift, when the planetary gear 21 is formed of metal, the two parts 21a and 21b may be press-fitted or caulked to each other. When the planetary gear 21 is implemented as a molding, use may be made of a bisected mold. The shift of half a pitch successfully corrects a phase difference between the two parts 21a and 21b of the planetary gear 21.

Figure 7A:
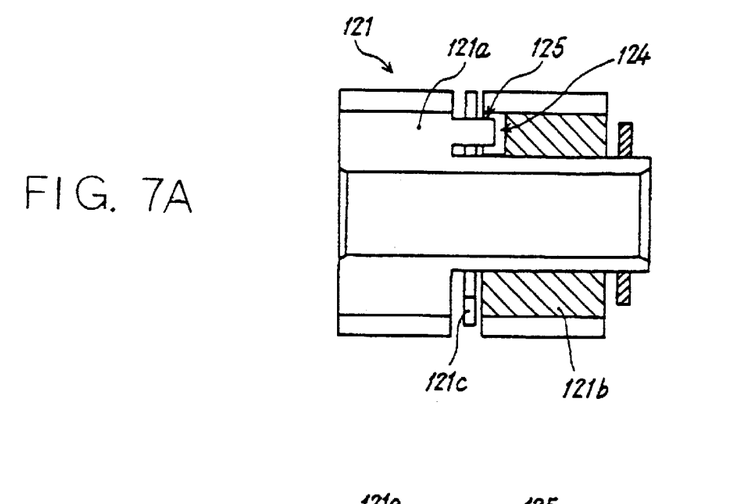
FIG. 7A is an axial section showing the planetary gear implemented as a scissors gear.
Figure 7B:
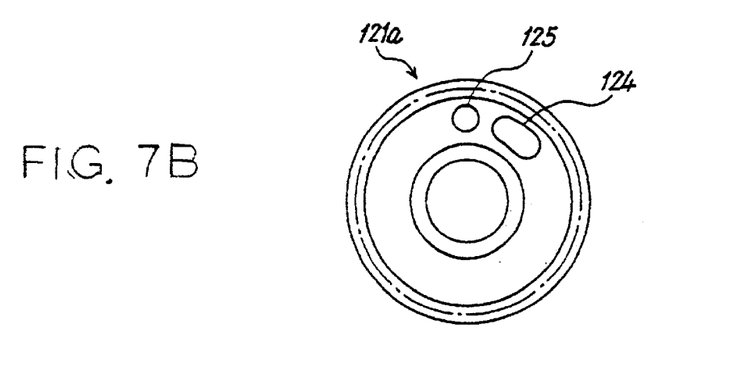
FIG. 7B is a side elevation showing part of the scissors gear meshing with the stationary gear.
Figure 7C:
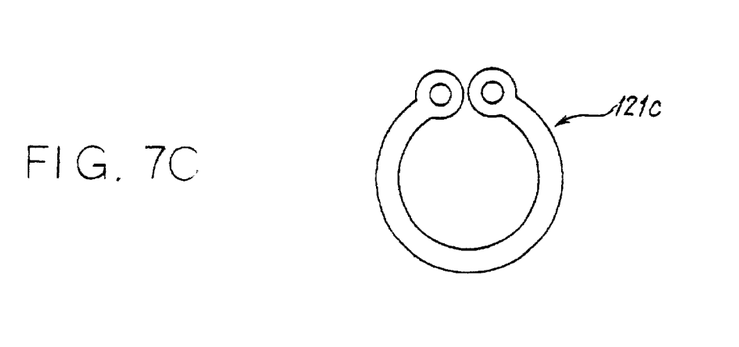
FIG. 7C is an external view showing a leaf spring constantly biasing two portions of the scissors gear in opposite directions to each other.

If desired, either one of the two planetary gears 21 may be implemented as a scissors gear. A specific configuration of one planetary gear 21 implemented as a scissors gear will be described with reference to FIGS. 7A through 7C. As shown, the planetary gear, labeled 121, includes two portions 121a and 121b meshing with the stationary gear 14 and output gear 16, respectively. A pin studded on the portion 121b is inserted in a notch 124 formed in the portion 121a. Likewise, a pin 125 studded on the portion 121a is inserted in a notch 124 formed in the portion 121b. FIG. 7C shows a leaf spring or elastic member 121c constantly biasing the two portions 121a and 121b in opposite directions of rotation. As shown, the leaf spring 121c is formed with two holes in which the pins 125 of the portions 121a and 121b are respectively inserted. The biasing force of the leaf spring 121c is selected such that a torque that is one-half of the torque necessary for the output shaft 11 is transferred to the output gear 16. The maximum range over which the portions 121a and 121b rotate is selected to be 0.5 pitch by the pins 125 and notches 124.

Figure 8:
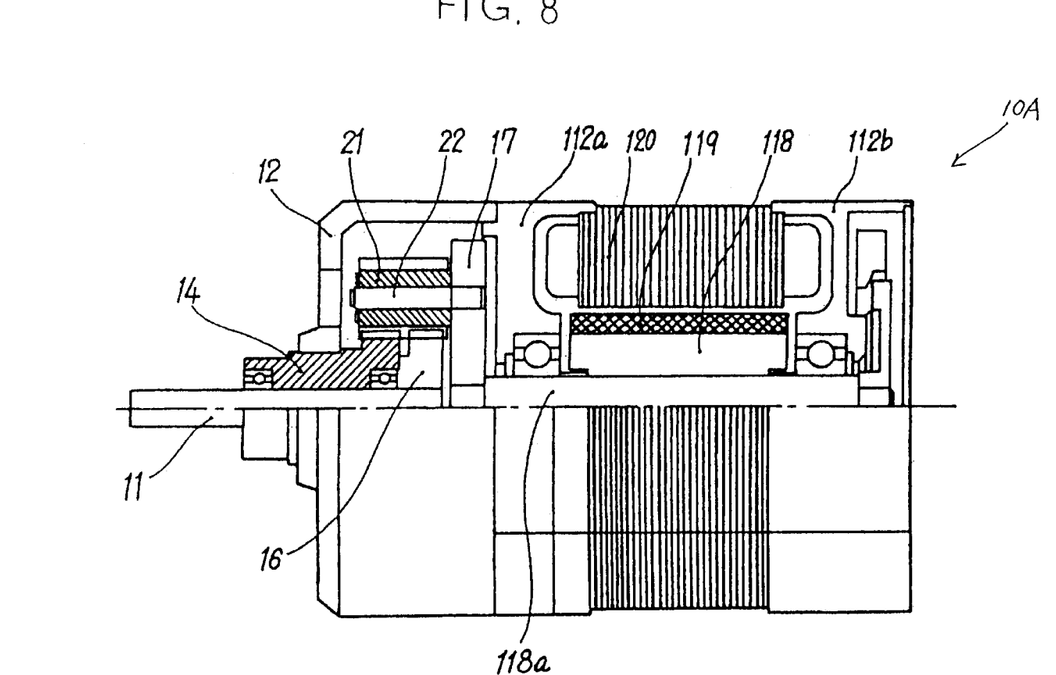
FIG. 8 is a fragmentary section showing an alternative configuration of the illustrative embodiment that uses an inner rotor type DC motor instead of an outer rotor type motor.

FIG. 8 shows an alternative configuration of the drum driving device of the illustrative embodiment, As shown, the drum driving device, generally 10A, is implemented as an inner rotor type DC motor instead of the outer rotor type motor described above. The drum driving device 10A includes a motor shaft 118a rotatably mounted on the output shaft 11 and an inner rotor 118 affixed to the motor shaft 118a. A covers 112a and 112b constitute a motor casing accommodating the inner rotor 118. A stator core 120 is affixed to the covers 112a and 112b. The rotary disk 17 is press-fitted on otherwise affixed to the portion of the motor shaft 118a adjoining the planetary gear 21. The planetary gear shaft 22 is press-fitted or otherwise affixed to the disk 17. The planetary gear 21 is rotatably mounted on the planetary gear shaft 22, as stated earlier. The DC motor may, of course, be replaced with a stepping motor or an AC motor by way of example.

A specific example of the illustrative embodiment will be described on the assumption that it outputs copies at a speed of twenty copies for a minute or so. To implement such a copying speed, the drum 1 is usually rotated at a speed of eighty revolutions for a minute although it depends on the diameter of the drum 1. Assuming that the optimal revolution speed of the motor, which may be of either one of the outer rotor type and inner rotor type, is 1,600 revolutions for a minute, then a reduction ratio necessary for driving the drum 1 is 1/20. In light of this, in the specific example, the stationary gear 14, output gear 16 and each planetary gear 21 are provided with thirty-eight teeth, forty-teeth and nineteen teeth, respectively. It is to be noted that the number of teeth of the planetary gear 21 is open to choice.

In the above specific conditions, the variations of rotation speeds ascribable to machining errors and assembling errors include 1.33 Hz ascribable to the eccentricity of the output gear 16, 26.66 Hz ascribable to the eccentricity of the stationary gear 14, 26.66 Hz ascribable to the eccentricity of the disk 17, 26.66 Hz ascribable to the assembly eccentricity of the input shaft, i.e., the shaft of the outer rotor or the inner rotor and that of the output shaft 11, 53.33 Hz ascribable to the eccentricity of the planetary gear 21, and 1,013 Hz ascribable to the tooth accuracy (intermeshing frequency) of the gears 14, 16 and 21.

The output shaft 16, stationary gear 14 and disk 17 all rotate about the output shaft 11, as stated earlier. Therefore, as for the relatively low-frequency variations other than the variation ascribable to the tooth accuracy, it is relatively easy to set eccentricity and coaxial relation with high accuracy. The tooth accuracy, which brings about the variation of higher than 1 kHz, can be coped with by a configuration implementing high productivity. For example, the gears 14, 16 and 21 may be constituted by helical gears, scissors gears or moldings of plastics in order to attenuate the high intermeshing frequency. These, in combination, realize noise reduction ascribable to the intermeshing of gears.

As stated above, the illustrative embodiment includes an output gear, a stationary gear and planetary gears. The output gear is affixed to an output shaft connected to an object to be driven. The stationary gear has a smaller number of teeth than the output gear and is coaxial with the output shaft, but not rotatable. The planetary gears each are freely rotatable about a respective planetary gear shaft, which is caused to revolve round the output shaft and stationary shaft by a drive source. The planet arygears therefore revolve round the output gear and stationary gear in mesh with the latter while rotating about their own axes. Two portions of each planetary gear meshing with the stationary gear and output gear, respectively, have the same number of teeth as each other. At least one of the output gear, stationary gear and the two portions of each planetary gear is implemented as a profile shifted gear. With such a configuration, it is possible to cause each planetary gear to adequately mesh with both of the coaxial stationary gears and output gears different in the number of teeth from each other, realizing smooth drive.

Because the two portions of each planetary gear mentioned above have the same number of teeth, a reduction ratio available with the illustrative embodiment is produced by the following equation (3) that is the modification of the previously stated equation (2):

$$N_5 = N_1 \times (Z_5 - Z_3)/Z_5 \qquad \text{Eq. (3)}$$

where $N_1$ denotes the number of rotations of the input shaft, $N_5$ denotes the number of rotations of the output shaft, $Z_3$ denotes the number of teeth of the stationary gear, and $Z_5$ denotes the number of teeth of the output gear.

As the Eq. (3) indicates, the reduction ratio of the illustrative embodiment is determined by the number of teeth of the stationary gear and that of the output gear without regard to the number of teeth of the planetary gear. The illustrative embodiment therefore achieves a higher reduction ratio than conventional even if the number of teeth of the stationary gear and that of the output gear is smaller. That is, for a given reduction ratio, the illustrative embodiment reduces the number of teeth and therefore the diameter of the stationary gear and that of the output gear. For example, for a reduction ratio of 1/20, if the difference in the number of teeth between the stationary gear and that of the output gear is two, then the stationary gear and output gear should only be provided with thirty-eight teeth and forty teeth, respectively. Also, if the difference in the number of teeth is one, then the stationary gear and output gear should only be provided with nineteen teeth and twenty teeth, respectively.

Further, a decrease in the diameter of each of the stationary gear and output gear achievable with the illustrative embodiment translates into a decrease in the revolution diameter of each planetary gear even when the planetary gear is caused to revolve at high speed. This readily balances the rotation and therefore realizes smooth drive.

Moreover, the number of teeth of each planetary gear is open to choice because the reduction ratio of the illustrative embodiment is not influenced by the number of gears of the planetary gear. Consequently, the diameter of the planetary gear can also be reduced and reduces the space necessary for the planetary gear to revolve round the stationary gear and output gear. Consequently, the entire drum driving device can be made compact in the radial direction of the stationary gear and output gear.

While the illustrative embodiment is applied to the drum driving device 10 for driving the drum 1, the present invention is similarly applicable to any kind of reduction device that reduces the rotation speed of a motor. For example, in the case of the copier, the present invention is applicable to any one of drive sources assigned to the drive roller for driving the belt 5, fixing roller pair 8, the developing roller of the developing unit 9, primary image transfer roller, secondary image transfer roller 7, and registration roller. Of course, the present invention is applicable not only to the copier shown and described, but also to any other technical field.

In summary, it will be seen that the present invention achieves various unprecedented advantages, as enumerated below.

(1) For a given reduction ratio, a stationary gear and an output gear need a smaller number of teeth each than conventional. In addition, the diameter of each of the stationary gear and output gear can be reduced because the number of teeth of a planetary gear is open to choice. Consequently, a high reduction ratio and accurate transfer of a constant torque can be implemented without increasing the size of an image forming apparatus.

(2) The planetary gear can adequately mesh with the stationary bear and output gear each having a particular number of teeth and can therefore stably transfer the torque of a drive source to a desired object to be driven.

(3) Thrust forces generated between the planetary bear and the stationary gear and output gear cancel each other, further stabilizing the transfer of the torque.

(4) Noise ascribable to intermeshing is reduced while a load acting on an intermeshing portion during idling is reduced.

(5) The planetary gear can revolve round a sun gear in a well-balanced condition. This, coupled with the scattering of the gear loads, reduces vibration.

(6) Backlash and therefore noise is reduced. When a difference in the number of teeth between the output gear and the stationary gear is odd, a phase shift of half a pitch can be adjusted if one planetary gear is implemented as a scissors gear. Therefore, stable torque transfer is achievable with a simple construction.

(7) A torque required of an output shaft can be smoothly transferred when two or three planetary gears are used.

(8) A load to act on the gear transmission drive is reduced. This, coupled with a decrease in the number of parts, simplifies the construction and reduces cost.

(9) There can be effectively reduced the low frequency variation of rotation that is a serious problem with an object to be driven at a low rotation speed.

(10) Machining errors and assembling errors are reduced while the apparatus is thin and compact while insuring high image quality.

Various modifications will become possible for those skilled in the art after receiving the teachings of the present disclosure without departing from the scope thereof.

What is claimed is:

1. A planetary differential gear type reduction device for reducing a rotation speed of a drive source to a rotation speed necessary for an object to be driven to thereby transfer an output torque of said drive source, said planetary differential gear type reduction device comprising:

an output gear affixed to an output shaft connected to the object, said output shaft extending through a hole in said output gear wherein said output gear is affixed to an outer surface of said output shaft;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear.

2. The reduction device as claimed in claim 1, wherein at least one of said output gear and said second portion of said planetary gear comprises a profile shifted gear, and said profile shifted gear is shifted in a direction in which when said second portion and said output gear mesh with each other, a diameter of a intermeshing pitch circle of said output gear decreases.

3. The reduction device as claimed in claim 2, wherein at least one of said stationary gear and said first portion of said planetary gear comprises a profile shifted gear, and said profile shifted gear is shifted in a direction in which when said first portion and said stationary gear mesh with each other, a diameter of a intermeshing pitch circle of said stationary gear increases.

4. The reduction device as claimed in claim 3, wherein said planetary gear comprises a helical gear and has said first portion and said second portion each having teeth twisted in a particular direction.

5. The reduction device as claimed in claim 2, wherein said planetary gear comprises three planetary gears equally spaced from each other, and two of said three planetary gears comprise scissors gears each having said first portion and said second portion constantly biased in opposite directions to each other as to rotation.

6. The reduction device as claimed in claim 5, wherein each of said scissors gears biases said first portion and said second portion in the opposite directions with a force that causes a torque corresponding to one-third of a torque necessary for said output shaft is transferred to said output gear.

7. The reduction device as claimed in claim 2, wherein said planetary gear comprises a single planetary gear.

8. The reduction device as claimed in claim 1, wherein at least one of said stationary gear and said first portion of said planetary gear comprises a profile shifted gear, and said profile shifted gear is shifted in a direction in which when said first portion and said stationary gear mesh with each other, a diameter of a intermeshing pitch circle of said stationary gear increases.

9. The reduction device as claimed in claim 3, wherein said planetary gear comprises a helical gear and has said first portion and said second portion each having teeth twisted in a particular direction.

10. The reduction device as claimed in claim 8, wherein said planetary gear comprises three planetary gears equally spaced from each other, and two of said three planetary gears comprise scissors gears each having said first portion and said second portion constantly biased in opposite directions to each other as to rotation.

11. The reduction device as claimed in claim 10, wherein each of said scissors gears constantly biases said first portion and said second portion in the opposite directions with a force that causes a torque corresponding to one-third of a torque necessary for said output shaft is transferred to said output gear.

12. The reduction device as claimed in claim 8, wherein said planetary gear comprises a single planetary gear.

13. The reduction device as claimed in claim 1, wherein said planetary gear comprises a helical gear and has said first portion and said second portion each having teeth twisted in a particular direction.

14. The reduction device as claimed in claim 13, wherein said planetary gear comprises three planetary gears equally spaced from each other, and two of said three planetary gears comprise scissors gears each having said first portion and said second portion constantly biased in opposite directions to each other as to rotation.

15. The reduction device as claimed in claim 14, wherein each of said scissors gears biases said first portion and said second portion in the opposite directions with a force that causes a torque corresponding to one-third of a torque necessary for said output shaft is transferred to said output gear.

16. The reduction device as claimed in claim 13, wherein said planetary gear comprises a single planetary gear.

17. The reduction device as claimed in claim 1, wherein said planetary gear comprises two planetary gears symmetrical to each other with respect to an axis of said stationary gear and said output gear.

18. The reduction device as claimed in claim 17, wherein one of said planetary gears comprises a scissors gear having said first portion and said second portion constantly biased in opposite directions to each other as to rotation.

19. The reduction device as claimed in claim 18, wherein said scissors gear biases said first portion and said second portion in the opposite directions with a force that causes a torque corresponding to one-half of a torque necessary for said output shaft is transferred to said output gear.

20. The reduction device as claimed in claim 17, wherein a difference between a number of teeth of said output shaft and a number of teeth of said stationary shaft is odd, and one of said planetary gears comprises a scissors gear having said first portion and said second portion constantly biased in opposite directions to each other as to rotation and having a maximum range of rotation of 0.5 pitch.

21. The reduction device as claimed in claim 17, wherein a difference between a number of teeth of said output gear and a number of teeth of said stationary gear is even, and said first portion and said second portion of each of said planetary gears have a same pitch as each other.

22. The reduction device as claimed in claim 17, wherein a difference between a number of teeth of said output gear and a number of teeth of said stationary gear is odd, and said first portion and said second portion of one of said planetary gears is shifted by half a pitch relative to the other of said first portion and said second portion.

23. The reduction device as claimed in claim 1, wherein said planetary gear comprises three planetary gears equally spaced from each other, and two of said three planetary gears comprise scissors gears each having said first portion and said second portion constantly biased in opposite directions to each other as to rotation.

24. The reduction device as claimed in claim 23, wherein each of said scissors gears biases said first portion and said second portion in the opposite directions with a force that causes a torque corresponding to one-third of a torque necessary for said output shaft is transferred to said output gear.

25. The reduction device as claimed in claim 1, wherein said planetary gear comprises a single planetary gear.

26. A planetary differential gear type reduction device for reducing a rotation speed of a drive source to a rotation speed necessary for an object to be driven to thereby transfer an output torque of said drive source, said planetary differential gear type reduction device comprising:

an output gear affixed to an output shaft connected to the object;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear, wherein at least one of said output gear and said second portion of said planetary gear comprises a profile shifted gear, and said profile shifted gear is shifted in a direction in which when said second portion and said output gear mesh with each other, a diameter of a intermeshing pitch circle of said output gear decreases, wherein at least one of said stationary gear and said first portion of said planetary gear comprises a profile shifted gear, and said profile shifted gear is shifted in a direction in which when said first portion and said stationary gear mesh with each other, a diameter of a intermeshing pitch circle of said stationary gear increases, wherein said planetary gear comprises a helical gear and has said first portion and said second portion each having teeth twisted in a particular direction, wherein a sum of a contact ratio between said stationary gear and said planetary gear and a contact ratio of said output shaft and said planetary gear is between 1.0 and 5.0.

27. The reduction device as claimed in claim 26, wherein said planetary gear comprises two planetary gears symmetrical to each other with respect to an axis of said stationary gear and said output gear.

28. The reduction device as claimed in claim 27, a difference between a number of teeth of said output gear and a number of teeth of said stationary gear is odd, and said first portion and said second portion of one of said planetary gears is shifted by half a pitch relative to the other of said first portion and said second portion.

29. The reduction device as claimed in claim 27, wherein a difference between a number of teeth of said output gear and a number of teeth of said stationary gear is even, and said first portion and said second portion of each of said planetary gears have a same pitch as each other.

30. The reduction device as claimed in claim 27, wherein a difference between a number of teeth of said output shaft and a number of teeth of said stationary shaft is odd, and one of said planetary gears comprises a scissors gear having said first portion and said second portion constantly biased in opposite directions to each other as to rotation and having a maximum range of rotation of 0.5 pitch.

31. The reduction device as claimed in claim 27, wherein one of said planetary gears comprises a scissors gear having said first portion and said second portion constantly biased in opposite directions to each other as to rotation.

32. The reduction device as claimed in claim 31, wherein said scissors gear biases said first portion and said second portion in the opposite directions with a force that causes a torque corresponding to one-half of a torque necessary for said output shaft is transferred to said output gear.

33. A planetary differential gear type reduction device for reducing a rotation speed of a drive source to a rotation speed necessary for an object to be driven to thereby transfer an output torque of said drive source, said planetary differential gear type reduction device comprising:

an output gear affixed to an output shaft connected to the object;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear, wherein at least one of said output gear and said second portion of said planetary gear comprises a profile shifted gear, and said profile shifted gear is shifted in a direction in which when said second portion and said output gear mesh with each other, a diameter of a intermeshing pitch circle of said output gear decreases, wherein at least one of said stationary gear and said first portion of said planetary gear comprises a profile shifted gear, and said profile shifted gear is shifted in a direction in which when said first portion and said stationary gear mesh with each other, a diameter of a intermeshing pitch circle of said stationary gear increases, wherein said planetary gear comprises a helical gear and has said first portion and said second portion each having teeth twisted in a particular direction, wherein a sum of a contact ratio between said stationary gear and said planetary gear and a contact ratio of said output shaft and said planetary gear is between 1.0 and 5.0.

34. The reduction device as claimed in claim 33, wherein said planetary gear comprises two planetary gears symmetrical to each other with respect to an axis of said stationary gear and said output gear.

35. The reduction device as claimed in claim 34, wherein a difference between a number of teeth of said output gear and a number of teeth of said stationary gear is odd, and said first portion and said second portion of one of said planetary gears is shifted by half a pitch relative to the other of said first portion and said second portion.

36. The reduction device as claimed in claim 34, wherein a difference between a number of teeth of said output shaft and a number of teeth of said stationary shaft is odd, and one of said planetary gears comprises a scissors gear having said first portion and said second portion constantly biased in opposite directions to each other as to rotation and having a maximum range of rotation of 0.5 pitch.

37. The reduction device as claimed in claim 34, wherein a difference between a number of teeth of said output gear and a number of teeth of said stationary gear is even, and said first portion and said second portion of each of said planetary gears have a same pitch as each other.

38. The reduction device as claimed in claim 34, wherein one of said planetary gears comprises a scissors gear having said first portion and said second portion constantly biased in opposite directions to each other as to rotation.

39. The reduction device as claimed in claim 38, wherein said scissors gear biases said first portion and said second portion in the opposite directions with a force that causes a torque corresponding to one-half of a torque necessary for said output shaft is transferred to said output gear.

40. A planetary differential gear type reduction device for reducing a rotation speed of a drive source to a rotation speed necessary for an object to be driven to thereby transfer an output torque of said drive source, said planetary differential gear type reduction device comprising:

an output gear affixed to an output shaft connected to the object;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear, wherein said planetary gear comprises a helical gear and has said first portion and said second portion each having teeth twisted in a particular direction, wherein a sum of a contact ratio between said stationary gear and said planetary gear and a contact ratio of said output shaft and said planetary gear is between 1.0 and 5.0.

41. The reduction device as claimed in claim 40, wherein said planetary gear comprises two planetary gears symmetrical to each other with respect to an axis of said stationary gear and said output gear.

42. The reduction device as claimed in claim 41, wherein a difference between a number of teeth of said output shaft and a number of teeth of said stationary shaft is odd, and one of said planetary gears comprises a scissors gear having said first portion and said second portion biased in opposite directions to each other as to rotation and having a maximum range of rotation of 0.5 pitch.

43. The reduction device as claimed in claim 41, wherein a difference between a number of teeth of said output gear and a number of teeth of said stationary gear is odd, and said first portion and said second portion of one of said planetary gears is shifted by half a pitch relative to the other of said first portion and said second portion.

44. The reduction device as claimed in claim 41, wherein a difference between a number of teeth of said output gear and a number of teeth of said stationary gear is even, and said first portion and said second portion of each of said planetary gears have a same pitch as each other.

45. The reduction device as claimed in claim 41, wherein one of said planetary gears comprises a scissors gear having said first portion and said second portion constantly biased in opposite directions to each other as to rotation.

46. The reduction device as claimed in claim 45, wherein said scissors gear biases said first portion and said second portion in the opposite directions with a force that causes a torque corresponding to one-half of a torque necessary for said output shaft is transferred to said output gear.

47. A planetary differential gear type reduction device for reducing a rotation speed of a drive source to a rotation speed necessary for an object to be driven to thereby transfer an output torque of said drive source, said planetary differential gear type reduction device comprising:

an output gear affixed to an output shaft connected to the object;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear, wherein a sum of a contact ratio between said stationary gear and said planetary gear and a contact ratio of said output shaft and said planetary gear is between 1.0 and 5.0.

48. The reduction device as claimed in claim 47, wherein said planetary gear comprises two planetary gears symmetrical to each other with respect to an axis of said stationary gear and said output gear.

49. The reduction device as claimed in claim 48, wherein one of said planetary gears comprises a scissors gear having said first portion and said second portion constantly biased in opposite directions to each other as to rotation.

50. The reduction device as claimed in claim 49, wherein said scissors gear biases said first portion and said second portion in the opposite directions with a force that causes a torque corresponding to one-half of a torque necessary for said output shaft is transferred to said output gear.

51. The reduction device as claimed in claim 48, wherein a difference between a number of teeth of said output gear and a number of teeth of said stationary gear is even, and
said first portion and said second portion of each of said planetary gears have a same pitch as each other.

52. The reduction device as claimed in claim 48, wherein a difference between a number of teeth of said output gear and a number of teeth of said stationary gear is odd, and
said first portion and said second portion of one of said planetary gears is shifted by half a pitch relative to the other of said first portion and said second portion.

53. The reduction device as claimed in claim 48, wherein a difference between a number of teeth of said output shaft and a number of teeth of said stationary shaft is odd, and
one of said planetary gears comprises a scissors gear having said first portion and said second portion constantly biased in opposite directions to each other as to rotation and having a maximum range of rotation of 0.5 pitch.

54. The reduction device as claimed in claim 47, wherein said planetary gear comprises three planetary gears equally spaced from each other, and two of said three planetary gears comprise scissors gears each having said first portion and said second portion constantly biased in opposite directions to each other as to rotation.

55. The reduction device as claimed in claim 54, wherein each of said scissors gears biases said first portion and said second portion in the opposite directions with a force that causes a torque corresponding to one-third of a torque necessary for said output shaft is transferred to said output gear.

56. The reduction device as claimed in claim 47, wherein said planetary gear comprises a single planetary gear.

57. A driving device including a reduction mechanism, comprising:
a drive source for outputting a preselected torque with a preselected rotation speed about a drive axis; and reducing means for reducing the rotation speed of said drive source to a rotation speed necessary for an object to be driven to thereby transfer the torque of said drive source to said object;

said reducing means comprising a planetary differential gear type reducing device comprising:
an output gear affixed to an output shaft connected to the object, said output gear being coaxial with said drive axis;
a stationary gear smaller in a number of teeth than said output gear and coaxial with said output shaft, but not rotatable; and
a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear.

58. A driving device including a reduction mechanism, comprising:
a drive source for outputting a preselected torque with a preselected rotation speed; and
reducing means for reducing the rotation speed of said drive source to a rotation speed necessary for an object to be driven to thereby transfer the torque of said drive source to said object;
said reducing means comprising a planetary differential gear type reducing device comprising:
an output gear affixed to an output shaft connected to the object;
a stationary gear smaller in a number of teeth than said output gear and coaxial with said output shaft, but not rotatable; and
a planetary gear rotatably mounted on a planetary gear shaft, which is driven by the torque of the drive source to revolve round said output gear and said stationary gear, and revolving round said output gear and said stationary gear in mesh with said output gear and said stationary gear;
wherein said planetary gear has a first portion and a second portion meshing with said stationary gear and said output gear, respectively, and having a same number of teeth as each other and at least one of said output gear, said stationary gear and said first portion and said second portion of said planetary gear comprises a profile shifted gear, further comprising:
power inputting member for driving said planetary gear shaft, which is affixed to said power inputting member, such that said planetary gear revolves round said output gear and said stationary gear; and
a torque transmitting member for transmitting the torque from the drive source to said power inputting member;
wherein said stationary member and said power inputting member are rotatably mounted on said output shaft.

59. The driving device as claimed in claim 58, wherein the drive source comprises an outer rotor type motor while said power inputting member comprises an outer rotor of said outer rotor type motor.

60. The driving device as claimed in claim 59, wherein said output shaft is rotatable relative to a stationary gear shaft support member, which supports said stationary gear, and a stator core support member facing said support member and supporting a stator core of said outer rotor type motor, and said stationary gear, said output gear and said outer rotor type motor are sequentially arranged between said stationary gear support member and said stator core support member in this order.

61. An image forming apparatus comprising:

a rotary body to be rotated at a lower rotation speed than a drive source; and reducing means for reducing the rotation speed of said drive source to a rotation speed necessary for said rotary body driven to thereby transfer the torque of said drive source to said rotary body;

said reducing means comprising a planetary differential gear type reducing device comprising:

an output gear affixed to an output shaft connected to the object, said output gear being coaxial with a drive axis of said drive source;

a stationary gear smaller in a number of teeth than said output gear and coaxial with said output shaft, but not rotatable; and a planetary gear rotatably mounted on a planetary gear shaft, which is driven by the torque of the drive source to revolve round said output gear and said stationary gear, and revolving round said output gear and said stationary gear in mesh with said output gear and said stationary gear;

wherein said planetary gear has a first portion and a second portion meshing with said stationary gear and said output gear, respectively, and having a same number of teeth as each other, and at least one of said output gear, said stationary gear and said first portion and said second portion of said planetary gear comprises a profile shifted gear.

\* \* \* \* \*